(12) United States Patent
Lemmers, Jr.

(10) Patent No.: US 8,226,522 B2
(45) Date of Patent: Jul. 24, 2012

(54) COUPLING FOR GENERATOR/STARTER

(75) Inventor: Glenn C. Lemmers, Jr., Loves Park, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 870 days.

(21) Appl. No.: 12/317,744

(22) Filed: Dec. 29, 2008

(65) Prior Publication Data
US 2010/0167863 A1 Jul. 1, 2010

(51) Int. Cl.
*F16H 3/44* (2006.01)
(52) U.S. Cl. ............................ 475/323; 475/8; 475/330
(58) Field of Classification Search .................. 475/1, 5, 475/8, 31, 72, 73, 84, 91, 199, 204, 219, 475/323, 329, 330
See application file for complete search history.

(56) References Cited

U.S. PATENT DOCUMENTS

| | | | |
|---|---|---|---|
| 3,274,855 A | 9/1966 | Reynolds et al. | |
| 3,468,402 A | 9/1969 | Edwards | |
| 4,132,078 A | 1/1979 | Akeret | |
| 4,252,035 A | 2/1981 | Cordner et al. | |
| 4,315,442 A | 2/1982 | Cordner | |
| 4,706,521 A | 11/1987 | Anderson et al. | |
| 4,773,518 A | 9/1988 | Raad et al. | |
| 4,774,855 A * | 10/1988 | Murrell et al. | 475/31 |
| 4,843,912 A | 7/1989 | Quick | |
| 5,083,431 A | 1/1992 | Tysver | |
| 5,174,109 A | 12/1992 | Lampe | |
| 5,842,947 A | 12/1998 | Weilant | |
| 6,050,228 A | 4/2000 | Garnett et al. | |
| 7,186,203 B2 | 3/2007 | Tabata et al. | |
| 7,253,535 B2 | 8/2007 | Duesterhoeft | |
| 7,998,016 B2 * | 8/2011 | Si et al. | 475/284 |
| 2004/0098988 A1 * | 5/2004 | Goi | 60/772 |
| 2006/0249956 A9 | 11/2006 | Thomson et al. | |
| 2007/0021257 A1 * | 1/2007 | Klemen et al. | 475/5 |
| 2007/0225111 A1 | 9/2007 | Duong et al. | |
| 2008/0076614 A1 | 3/2008 | Himmelmann | |
| 2008/0153652 A1 | 6/2008 | Nett et al. | |

OTHER PUBLICATIONS

Wikipedia "Epicyclic Gearing," from <http://en.wikipedia.org/wiki/Epicyclic>, visited Dec. 5, 2008, (5 pages).

* cited by examiner

*Primary Examiner* — Justin Holmes
(74) *Attorney, Agent, or Firm* — Kinney & Lange, P.A.

(57) ABSTRACT

A coupling system includes a dynamoelectric device selectively operable as either a generator or an electric motor, a gas turbine engine, a main differential operably connected between the dynamoelectric device and the gas turbine engine, a rotationally powered accessory engaged with the main differential, an epicyclic start differential operatively connected to the main differential, and a brake mechanism. The brake mechanism is configured for selectively braking the epicyclic start differential when the dynamoelectric device operates as an electric motor to direct torque transmission to the gas turbine engine, and is further configured to cease braking the epicyclic start differential when the dynamoelectric device operates as a generator such that the main differential transmits torque to power the rotationally powered accessory and to the dynamoelectric device.

19 Claims, 6 Drawing Sheets

COUPLING FOR GENERATOR/STARTER

BACKGROUND

The present invention relates to mechanical couplings for transmitting torque between an engine and a generator/starter, and methods for using the same.

Gas turbine engines can include an integrated drive generator that converts mechanical energy from the gas turbine engine into electrical energy. When beginning in a stopped condition, gas turbine engines must generally reach a given operating speed before they are capable of self-sustained operation. Typically, gas turbine engines are started using a pneumatic starting mechanism, or by diverting power from another engine that is already operational. Such devices provide external power to the gas turbine engine, but can add weight and complexity, which is undesirable for many applications, such as aerospace applications.

It is desired to use a generator as a starter, to provide external power to a gas turbine engine to reach self-sustaining operation. Generators can be operated as electric motors (i.e., starters) by supplying electrical energy to its windings in a well-known manner. However, what may appear to be a simple matter of operating the generator as a motor to start the gas turbine engine is complicated by the presence of other devices engaged with drive shafting between the gas turbine engine and the generator/starter. For instance, a differential typically links the gas turbine engine and the generator/starter, and various pumps, hydraulic units and other equipment are engaged to the differential. Operation of the generator/starter as an electric motor is inhibited by the presence of the equipment engaged to the differential, which can cause the differential to undesirably divert torque produced by generator/starter to accessories like the hydraulic units rather than to the gas turbine engine. This represents an obstacle to using a generator as a starter for a gas turbine engine.

SUMMARY

A coupling system includes a dynamoelectric device selectively operable as either a generator or an electric motor, a gas turbine engine; a main differential operably connected between the dynamoelectric device and the gas turbine engine, a rotationally powered accessory engaged with the main differential, an epicyclic start differential operatively connected to the main differential, and a brake mechanism. The brake mechanism is configured for selectively braking the epicyclic start differential when the dynamoelectric device operates as an electric motor to direct torque transmission to the gas turbine engine, and is further configured to cease braking the epicyclic start differential when the dynamoelectric device operates as a generator such that the main differential transmits torque to power the rotationally powered accessory and to the dynamoelectric device.

DETAILED DESCRIPTION

In general, the present invention relates to a coupling system for mechanically linking a generator/starter (generally referred to as a dynamoelectric device) with a combustion engine, such as a gas turbine engine. In at least one embodiment, the present invention provides an epicyclic start differential in addition to a sun-less type epicyclic main differential having two ring gears. The main differential is operatively connected between the generator/starter and the combustion engine, and the start differential is operably connected to the main differential. The combustion engine can be started by operating the generator/starter as an electric motor, using a suitable motor controller and an electrical energy supply. A brake mechanism can selectively brake a portion of the start differential during a start mode, which adjusts main differential torque delivery by linking the two ring gears of the main differential though the start differential to help ensure torque delivery from the generator/starter to the combustion engine. Adjustment of torque delivery through the main differential during the start mode can help reduce an undesired diversion of torque to accessories (e.g., hydraulic units) engaged to the main differential. Once the combustion engine is able to achieve self-sustained operation, the motor controller can be shut off and electric motor operation of the generator/starter can cease and switch to operation as a generator. In a generator mode, braking of the start differential can cease, allowing torque from the combustion engine to be transmitted through the main differential to both the generator/starter and to accessories such as hydraulic units. In the generator mode the start differential can essentially freely wheel.

Figure 1:
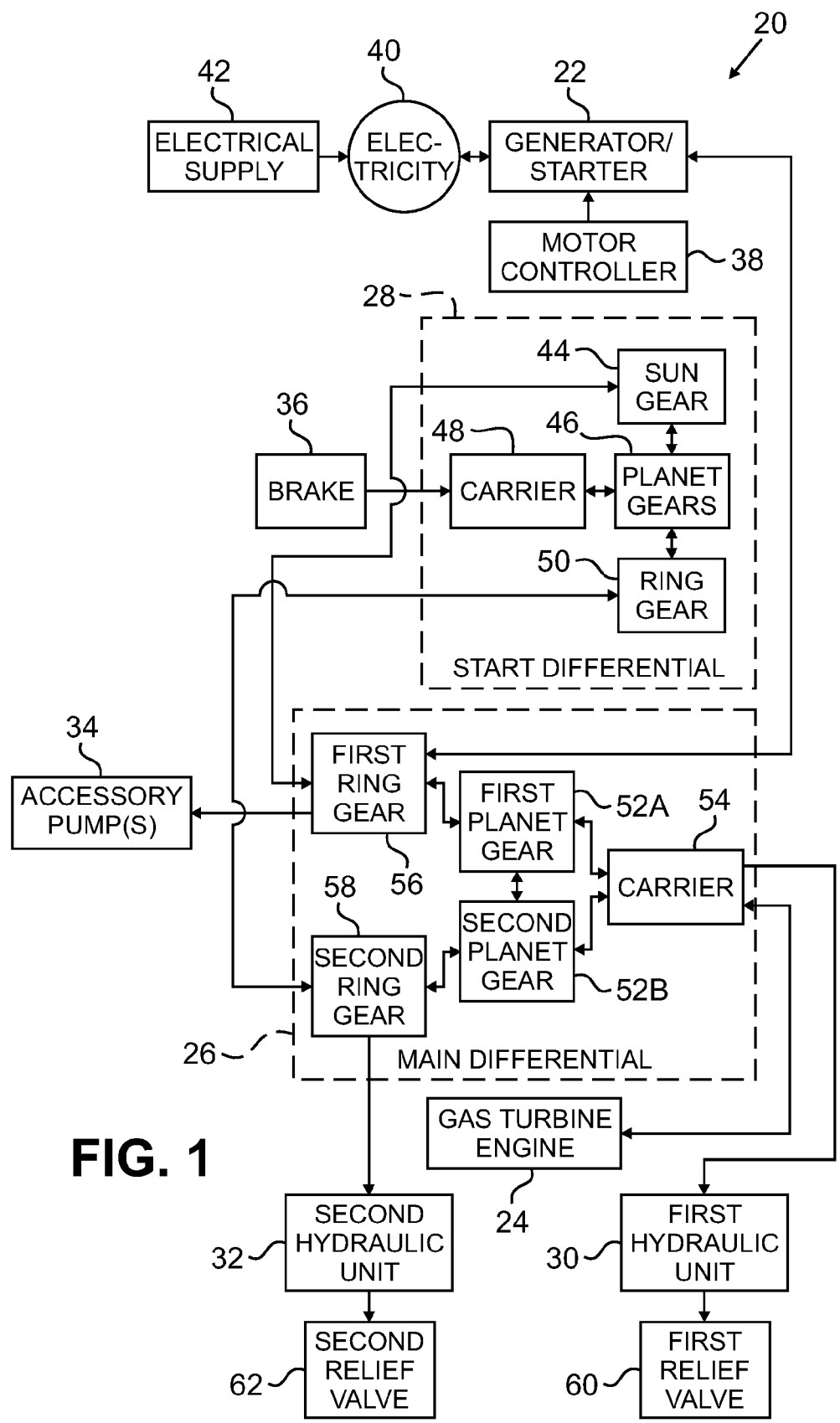
FIG. 1 is a block diagram of a coupling system according to the present invention.

FIG. 1 is a block diagram of a coupling system 20 that includes a generator/starter 22, a gas turbine engine 24, a main differential 26, a start differential 28, a first hydraulic unit 30, a second hydraulic unit 32, one or more accessory pumps 34, and a brake mechanism 36. The gas turbine engine 24 can be of a conventional type, such as a known gas turbine engine for aerospace applications. The generator/starter 22 can be of a conventional generator configuration, and is operably connected to a motor controller 38 to provide for operation as an electric motor (i.e., a starter). During electric motor operation, the generator/starter 22 uses electricity 40 from an electrical supply 42. In one embodiment, the electrical supply 42 is an external supply temporarily connected to the generator/starter 22 while on the ground.

The start differential 28 in the illustrated embodiment is configured as an epicyclic differential and includes a sun gear 44, a plurality of planet gears 46 (e.g., three planet gears), a carrier 48, and a ring gear 50. The planet gears 46 are configured to each mesh with both sun gear 44 and the ring gear 50. The planet gears 46 are each rotatably connected to the carrier 48. The brake mechanism 36 is configured to selectively brake the carrier 48, to slow or stop rotation of the carrier 48. Operation of the start differential 28 is described by the following equation:

$$\frac{N_{ring} - N_{carrier}}{N_{sun} - N_{carrier}} = -\frac{S}{R}$$

where $N_{ring}$, $N_{carrier}$ and $N_{sun}$ represent speed of the ring gear 50, the carrier 48 and the sun gear 44, respectively, S represents the number of teeth on the sun gear 44, and R represents the number of teeth on the ring gear 50.

The main differential 26 in the illustrated embodiment is configured as a sunless epicyclic differential (also known as a dual ring differential) and includes a plurality of planet gears (collectively designated by reference number 52, and including first planet gear 52A and second planet gear 52B), a carrier 54, a first ring gear 56 (also called an output ring gear) and a second ring gear 58 (also called a trim ring gear). The planet gears 52 mesh with each other. The first planet gear 52A meshes with the first ring gear 56, and the second planet gear 52B meshes with the second ring gear 58. The planet gears 52 are each rotatably connected to the carrier 54. The first ring gear 56 engages the generator/starter 22 and also the one or more accessory pumps 34. The carrier 54 engages the gas turbine engine 24 and also the first hydraulic unit 30. The second ring gear 58 engages the second hydraulic unit 32. Operation of the main differential 26 is described by the following equation:

$$\frac{N_{ring1} - N_{carrier}}{N_{ring2} - N_{carrier}} = -\frac{R_2}{R_1}$$

Where $N_{ring1}$, $N_{ring2}$, $N_{carrier}$ represent speed of the first ring gear 56, the second ring gear 58 and the carrier 54, respectively, $R_1$ represents the number of teeth on the first ring gear 56, and $R_2$ represents the number of teeth on the second ring gear 58.

The first hydraulic unit 30 can be a variable displacement hydraulic unit, and the second hydraulic unit 32 can be a fixed displacement hydraulic unit. The first and second hydraulic units 30 and 32, as well as the one or more accessory pumps 34, are powered by the gas turbine engine 24 through the main differential 26 during generator mode. In order to help limit operation and coupling of the first and second hydraulic units 30 and 32 during start mode, a first relief valve 60 and a second relief valve 62 operably connected to the first and second hydraulic units 30 and 32, respectively, can be provided. The first and second relief valves 60 and 62 can be of a known type, and selectively deprime the first and second hydraulic units 30 and 32. It should be noted that in alternative embodiments, the first and second hydraulic units 30 and 32 and the one or more accessory pumps 34 can be replaced with nearly any kind of fluid pump or other accessory that accepts a torque input, and selected ones can be omitted as desired for particular applications.

Figure 2:
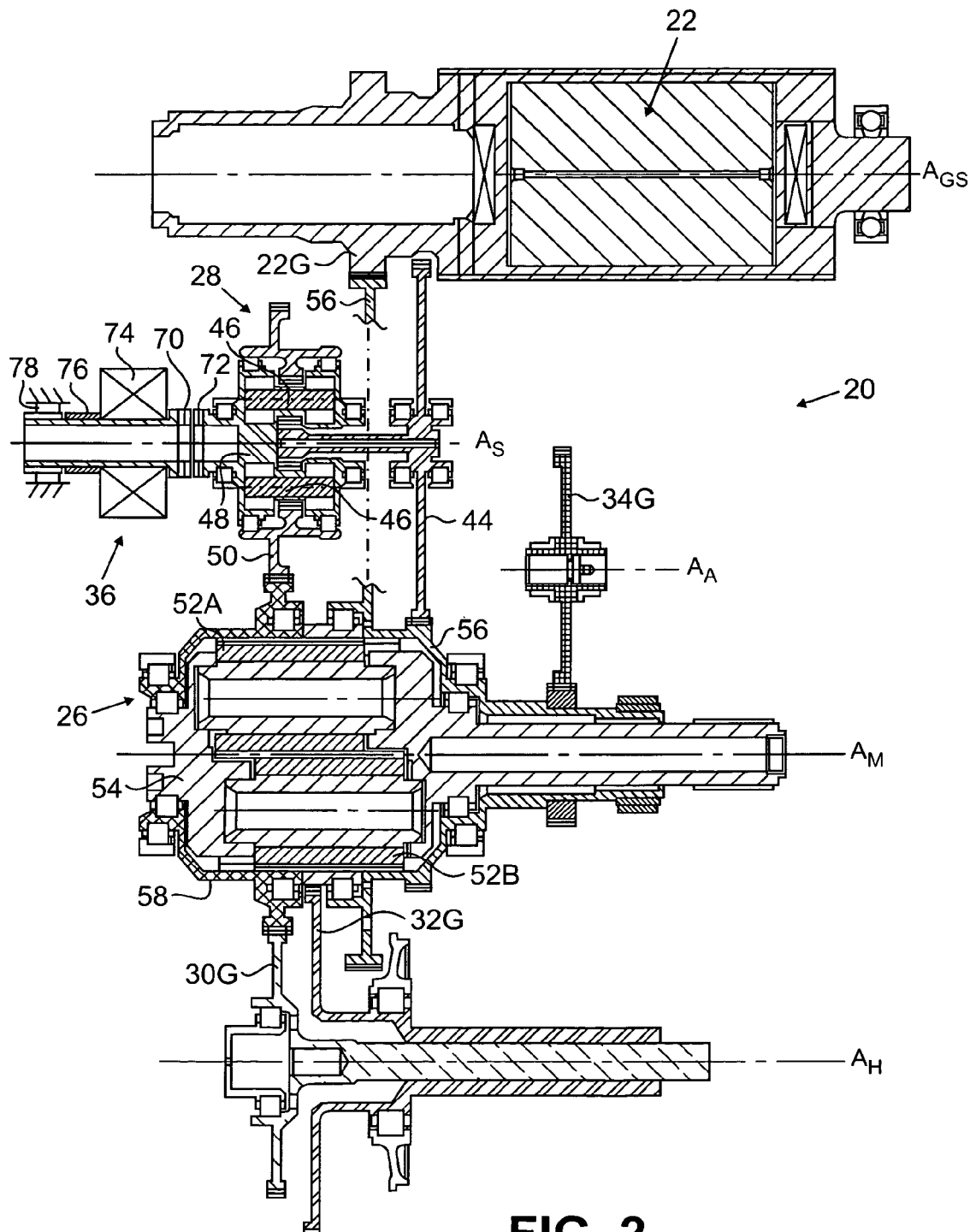
FIG. 2 is a cross-sectional view of a portion of the coupling system of FIG. 1.

FIG. 2 is a cross-sectional view of a portion of the coupling system 20 (shown in generator mode). As illustrated, the main differential 26 engages the generator/starter 22 (only a portion of which is shown in FIG. 2) and the start differential 28. More particularly, in the illustrated embodiment, the first ring gear 56 of the main differential 26 engages the sun gear 44 of the start differential 28, a rotor gear 22G of the generator/starter 22 (a portion of the first ring gear 56 is shown broken away in FIG. 2), and an input gear 34G of the one or more accessory pumps 34 (only a portion of which is shown in FIG. 2). The second ring gear 58 of the main differential 26 engages an input gear 30G of the first hydraulic unit 30 (only a portion of which is shown in FIG. 2) and the ring gear 50 of the start differential 28. The carrier 54 of the main differential 26 engages an input gear 32G of the second hydraulic unit 32 (only a portion of which is shown in FIG. 2) and is engaged with the gas turbine engine 24 (not shown in FIG. 2) through suitable shafting.

As shown in FIG. 2, the carrier 54 of the main differential 26 defines a central axis $A_M$, the sun gear 44 of the start differential 28 defines an axis $A_S$, the input gear 34G of the one or more accessory pumps 34 defines an axis $A_A$, the rotor gear 22G of the generator/starter 22 defines an axis $A_{GS}$, and the input gear 30G of the first hydraulic unit 30 defines an axis $A_H$. The input gear 32G of the second hydraulic unit 32 is arranged concentric with and radially outward from at least a portion of the input gear 30G of the first hydraulic unit 30 about the axis $A_H$. The axes $A_M$, $A_S$, $A_A$, $A_{GS}$ and $A_H$ are arranged parallel to one another, though the axes $A_M$, $A_S$, $A_A$, $A_G$ and $A_H$ need not all lie in a single plane.

The brake mechanism 36 can be configured as a face clutch assembly (e.g., similar to that disclosed in U.S. Pat. No. 4,773,518 entitled "Electromagnetic Clutch") arranged about the axis $A_S$ that includes a first clutch member 70, a second clutch member 72, an actuator 74, a biasing means 76, and a mounting structure 78. The first clutch member 70 is connected to the mounting structure with a splined connection that allows for axial movement therebetween. The biasing means 76 (e.g., a helical spring) is configured to axially bias the first clutch member 72 to a desired position. The actuator 74 (e.g., a solenoid) is configured to selectively axially move the first clutch member 70 in opposition to the biasing means 76. In one embodiment, the biasing means 76 urges the first clutch member 70 to an engaged position (to the right as shown in FIG. 2), and the actuator 74 can selectively urge the first clutch member 70 in an opposite direction to a disengaged position (to the left as shown in FIG. 2). Teeth of the first and second clutch members 70 and 72 can optionally have angled faces to facilitate disengagement in a particular rotational direction. The mounting structure 78 is a non-rotating structure, which allows the first clutch member 70 to be rotationally fixed thereto by way of the splined connection. The second clutch member 72 is carried on the carrier 48 of the start differential 28. In one embodiment, the second clutch member 72 is an integrally formed portion of the carrier 48. In alternative embodiments the second clutch member 72 is a separate structure fixed to the carrier 48 for co-rotation therewith.

In the illustrated embodiment, the first and second clutch members 70 and 72 defined opposed toothed faces that form a torque-transmitting coupling when moved axially together into engagement. Engagement of the first and second clutch members 70 and 72 brakes the carrier 48 of the start differential 28 relative to the mounting structure 78 to limit or prevent rotation of the carrier 48. As will be explained in greater detail, the brake mechanism 36 is engaged in the start mode. It should be noted that the configuration of the brake mechanism 36 is provided merely by way of example and not limitation. In alternative embodiments, other types of brake mechanisms can be used.

Figure 3A:
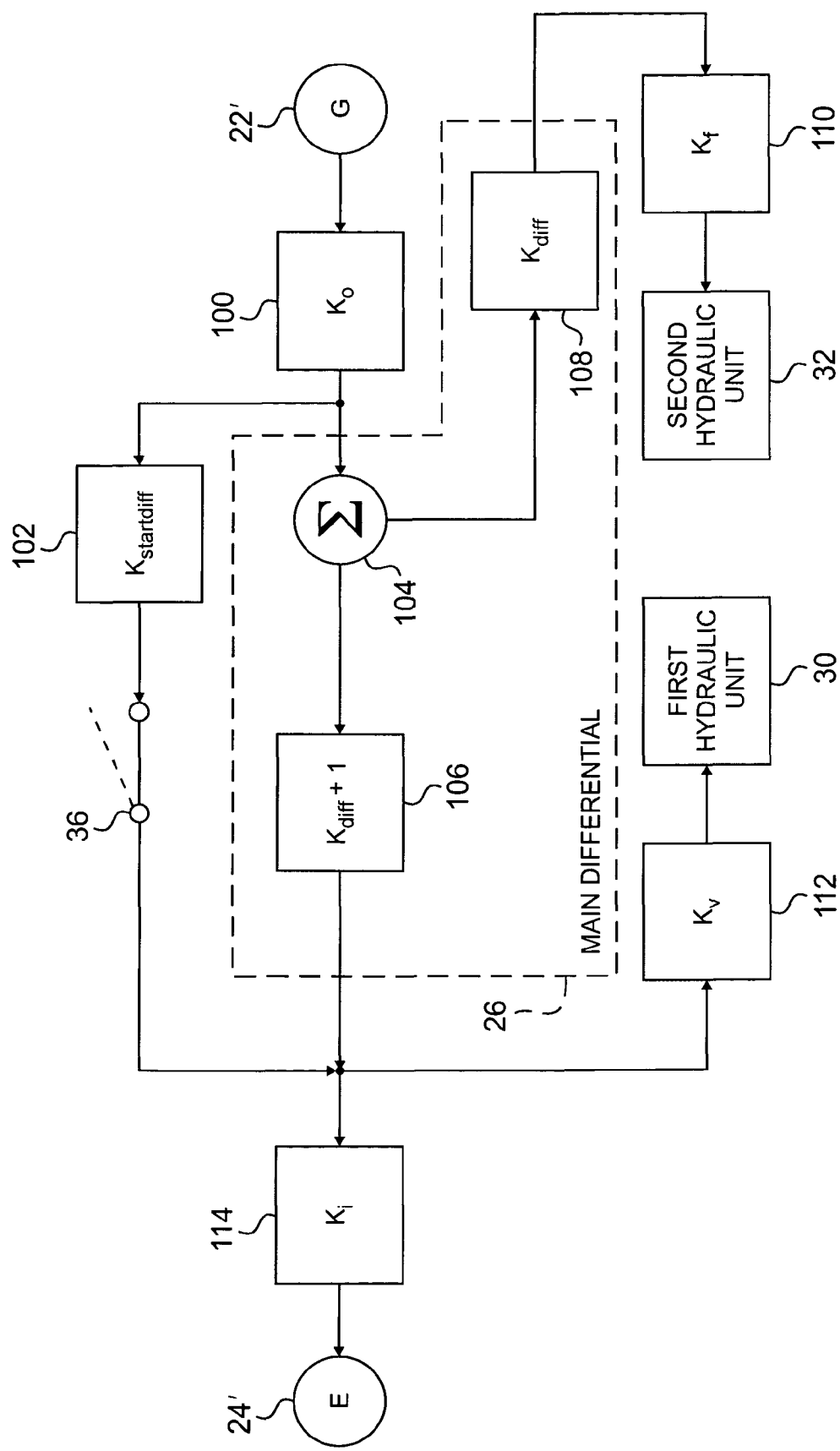
FIG. 3A is a block diagram of a portion of the coupling system of FIGS. 1 and 2 in a start mode.
Figure 3B:
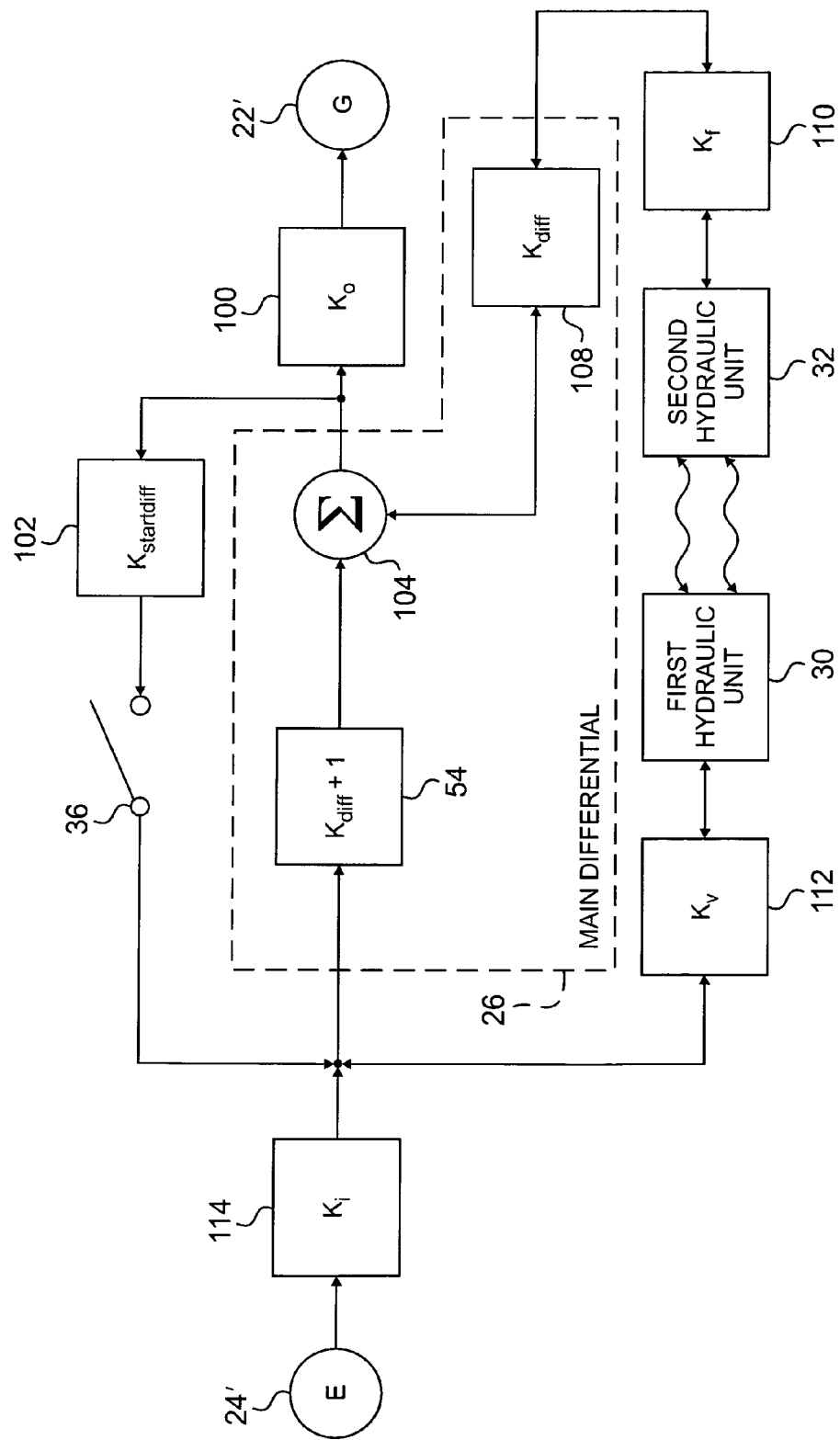
FIG. 3B is a block diagram of a portion of the coupling system of FIGS. 1-3 in a generator mode.

FIGS. 3A and 3B are block diagrams illustrating torque transmission through the coupling system 20 during start and generator modes. FIG. 3A is a block diagram of a portion of the coupling system 20 in the start mode, and FIG. 3B is a block diagram of a portion of the coupling system 20 in the generator mode. In both FIGS. 3A and 3B, block 100 represents a gear ratio $K_O$ between the first ring gear 56 of the main differential 26 and the rotor gear 22G of the generator/starter 22, block 102 represents gear ratio $K_{startdiff}$ between the ring gear 50 and the sun gear 44 of the start differential 28, block 104 represents a distribution Σ of torque accomplished by the first ring gear 56 and the planet gears 52 of the main differential 26, block 106 represents a gear ratio "$K_{diff}+1$" of the carrier 54 of the main differential 26, block 108 represents a gear ratio $K_{diff}$ of the second ring gear 58 of and the planet gears 52 of the main differential 26, block 110 represents a gear ratio $K_f$ between the input gear 32G of the second hydraulic unit 32 and the second ring gear 58 of the main differential 26, block 112 represents a gear ratio $K_v$ between the input gear 30G of the first hydraulic unit and the carrier 54 of the main differential 26, and block 114 represents a gear ratio $K_i$ between the engine 22 and the carrier 54 of the main differential 26. The brake mechanism 36 is represented as a switch. The engine 24 is associated with torque 24' and the generator/starter is associated with torque 22'. The gear ratio $K_i$ can be 1:1 in one embodiment. Furthermore, the gear ratio $K_{diff}$ is approximately 1:1 in one embodiment. In general, the gear ratios utilized according to the present invention can vary as desired for particular applications.

As shown in FIG. 3A, during start mode, the torque 22' is provided by the generator/starter 22 and is transmitted to the engine 24 as the torque 24' when the brake mechanism 36 is engaged (designated by a closed switch in FIG. 3A). As shown in FIG. 3B, during generator mode, the torque 24' is provided by the engine 22 and is transmitted to the generator/starter 22 as the torque 22'. The brake mechanism 36 is released in the generator mode. A hydrostatic coupling is present between the first and second hydraulic units 30 and 32 when in the generator mode. However, the hydrostatic coupling can be eliminated in the start mode due to braking of the start differential 28, as well as through depriming of the first and second hydraulic units 30 and 32.

Figure 4A:
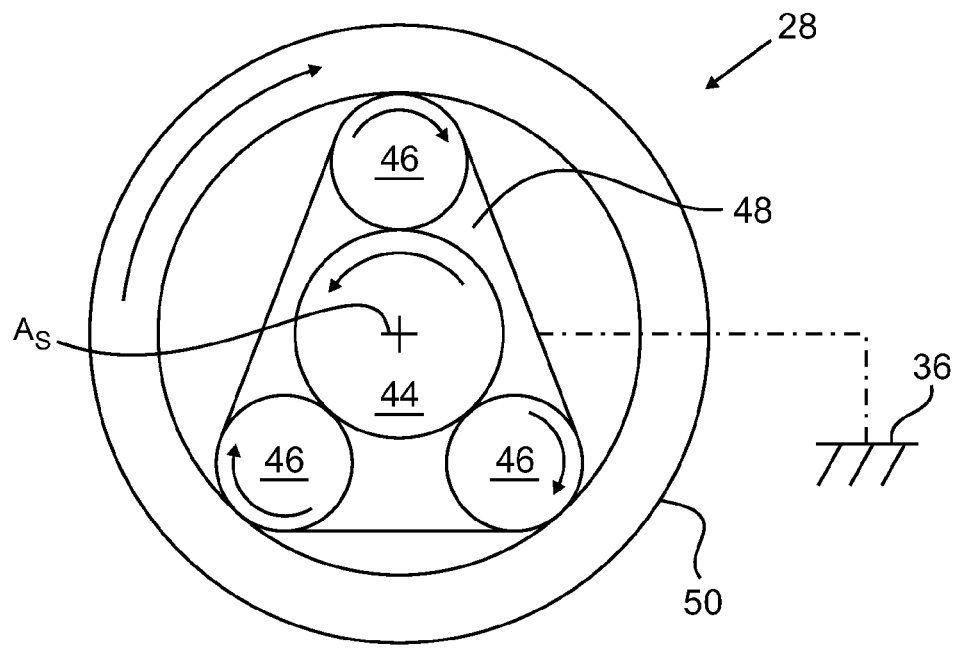
FIG. 4A is a schematic elevation view of a start differential of the coupling system of FIGS. 1-3B in the start mode.
Figure 4B:
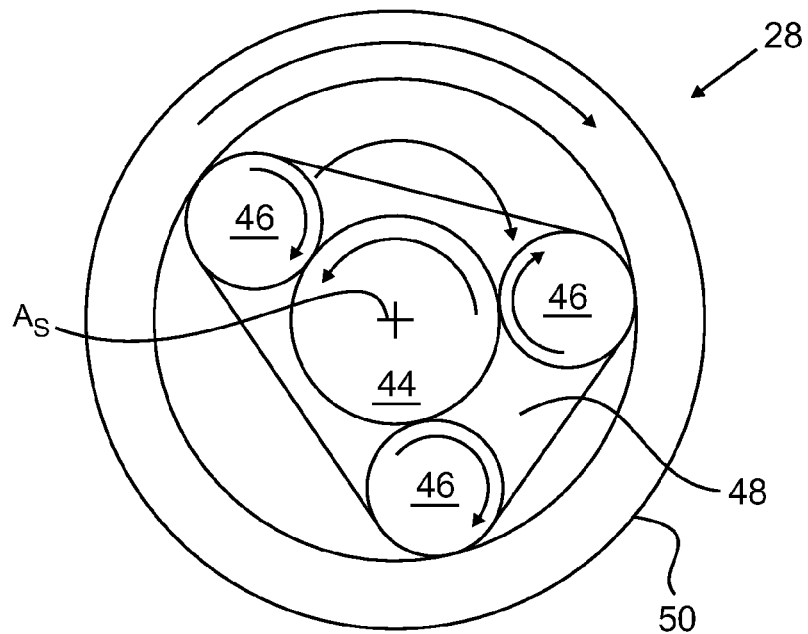
FIG. 4B is a schematic elevation view of the start differential of the coupling system of FIGS. 1-3B in the generator mode.

FIGS. 4A and 4B schematically illustrate operation of the start differential in different modes. FIG. 4A is a schematic elevation view of a start differential of the coupling system in the start mode, and FIG. 4B is a schematic elevation view of the start differential of the coupling system in the generator mode. Arrows designate directions of rotation. It should be noted that while FIGS. 4A and 4B illustrate an embodiment of the start differential 28 with three planet gears 46, different numbers of planet gears 46 can be used in alternative embodiments.

As shown in FIG. 4A, in the start mode, torque from the generator/starter 22 is transmitted from the rotor gear 22G to the first ring gear 56 of the main differential 26, and from the first ring gear 56 of the main differential 26 to the sun gear 44 of the start differential 28 (see also FIG. 2). The brake mechanism 36 rotationally slows or stops rotation of the carrier 48 of the start differential 28. When the carrier 48 is braked, rotation of the sun gear 44 (for illustrative purposes shown as counterclockwise rotation) produces rotation of the planet gears 46 (shown as clockwise rotation) which in turn produce rotation of the ring gear 50 (shown as clockwise rotation). The ring gear 50 of the start differential 28 causes rotation of the second ring gear 58 of the main differential 26 (see FIG. 2). In this way, in the start mode, the start differential 28 links the first and second ring gears 56 and 58 of the main differential 26 at a given gear ratio such that both the first and second ring gears 56 and 58 rotate (in opposite directions), which helps ensure that the carrier 54 of the main differential 26 rotates during the start mode to transmit torque to the gas turbine engine 24 (see FIG. 1). If the start differential 28 were not provided, uncontrolled rotation of the second ring gear 58 would inhibit rotation of the carrier 54. Insufficient rotation of the carrier 54 directly limits the ability of the generator/starter 22 to provide torque to start the gas turbine engine 24. That problem is overcome through use of the start differential 28. Furthermore, rotation of the first and second hydraulic units 30 and 32 during the start mode generally does not produce useful work.

As shown in FIG. 4B, in the generator mode, the brake mechanism 36 (not shown) has been released, which allows the carrier 48 of the start differential 28 to rotate (shown as clockwise rotation). This allows a torque adjustment in the main differential 26, such that the speed of the second ring gear 58 relative to the first ring gear 56 can change as compared to during the start mode. In general, speed of the sun gear 44 of the start differential 26 generally stays constant when switching from the start mode to the generator mode, while the speed of the ring gear 50 of the start differential 28 generally increases (at a proportion to engine speed). During the generator mode, the start differential 28 essentially freely wheels, without performing any torque transmission between the first and second ring gears 56 and 58 of the main differential 26.

Figure 5:
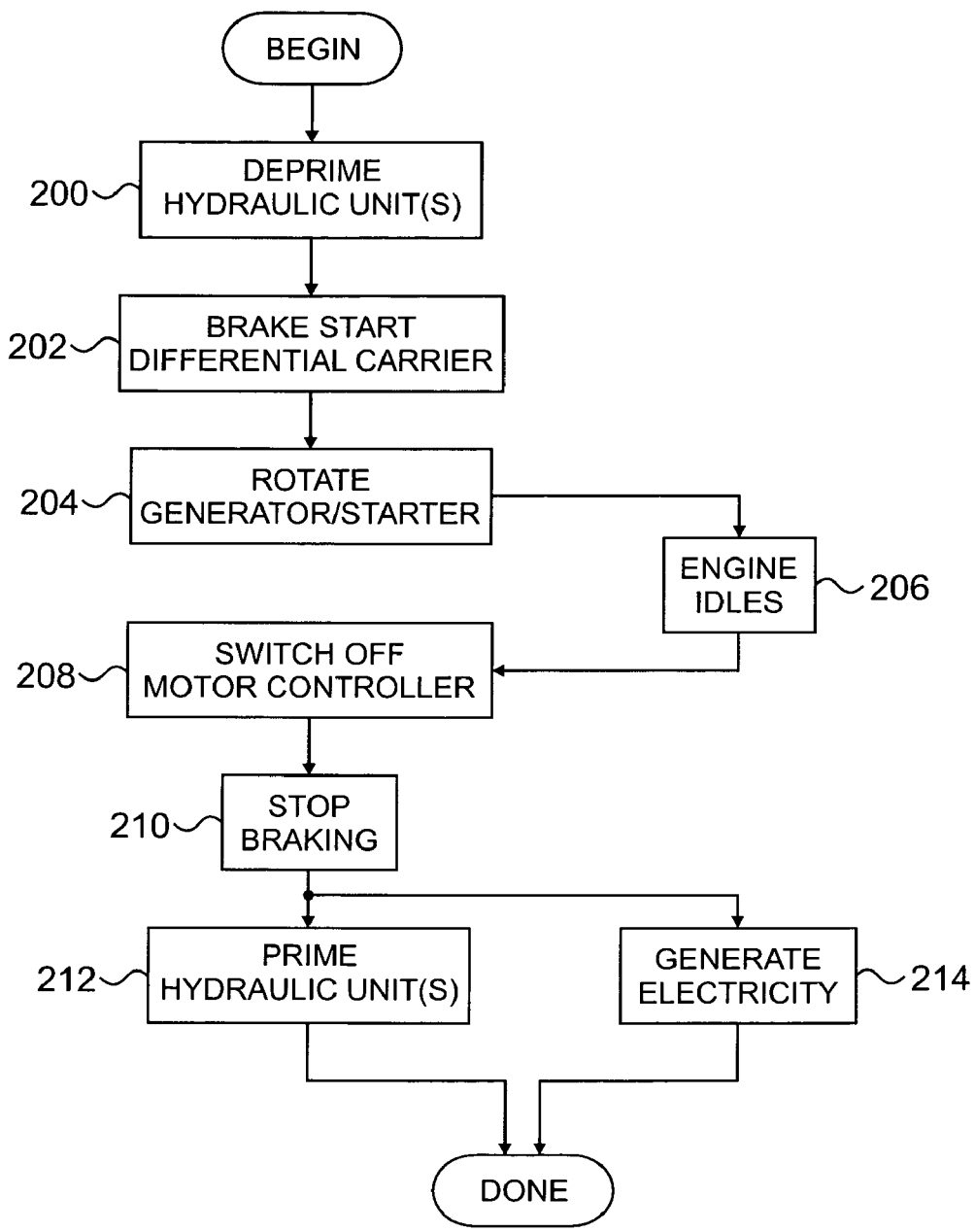
FIG. 5 is a flow chart illustrating operation of the coupling system of FIGS. 1-4B.

FIG. 5 is a flow chart illustrating operation of the coupling system 20 (see also FIG. 1). First, a start mode is initiated. One or more hydraulic units are deprimed (step 200), which can be accomplished by actuating one or both of the first and second relief valves 60 and 62. The depriming operation can help eliminate the hydrostatic coupling between the first and second hydraulic units 30 and 32. The carrier 48 of the start differential 28 is braked using the brake mechanism 36 (step 202), which links the first and second ring gears 56 and 58 of the main differential 26. The motor controller 38 then rotates the generator/starter 22 through operation as an electric motor (step 204), using electricity 40 from the electrical supply 42. The generator/starter 22 is rotated at a desired speed. Rotation of the generator/starter transmits torque to the gas turbine engine 24 (or other combustion engine), which will reach an idle speed and be able to achieve self-sustained operation (step 206). Once the gas turbine engine 24 is operational, as transition to generator mode is begun, the motor controller 38 is switched off or otherwise disables electric motor operation of the generator/starter 22 (step 208), and braking of the start differential 28 is stopped (step 210). The previously deprimed hydraulic units (e.g., the first and second hydraulic units 30 and 32) are then primed, and the generator mode begins with the gas turbine engine 24 delivering torque to the generator/starter 22 to generate electricity 40 (step 214).

Although the present invention has been described with reference to preferred embodiments, workers skilled in the art will recognize that changes may be made in form and detail without departing from the spirit and scope of the invention. For example, additional components not particularly described above can be used in conjunction with the system of the present invention, such as additional gears, pumps, controller circuits, etc. Furthermore, the present invention can be utilized with various types of components as desired for particular applications, for example, the present invention can be used with nearly any type of combustion engine.

The invention claimed is:

1. A coupling system comprising:
   a dynamoelectric device selectively operable as either a generator or an electric motor;
   a gas turbine engine;
   a main differential operably connected between the dynamoelectric device and the gas turbine engine, wherein the main differential is a sunless epicyclic gear assembly comprising:
   a plurality of main differential planet gears arranged to mesh with each other;
   a first main differential ring gear that meshes with a first of the plurality of main differential planet gears;

a second main differential ring gear that meshes with a second of the plurality of main differential planet gears; and a main differential carrier rotatably connected to each of the main differential planet gears;

a rotationally powered accessory engaged with the main differential;

an epicyclic start differential operatively connected to the main differential; and a brake mechanism configured for selectively braking the epicyclic start differential when the dynamoelectric device operates as an electric motor to direct torque transmission to the gas turbine engine, wherein the brake mechanism is configured to cease braking the epicyclic start differential when the dynamoelectric device operates as a generator such that the main differential transmits torque to power the rotationally powered accessory and to the dynamoelectric device, and wherein the start differential is configured to transmit torque between the first main differential ring gear and the second main differential ring gear when the brake mechanism brakes a start differential carrier.

2. The system of claim 1, wherein the epicyclic start differential comprises:

a start differential sun gear operatively connected to the main differential;

a plurality of start differential planet gears that each mesh with the start differential sun gear, wherein the start differential carrier is rotatably connected to each of the start differential planet gears, and wherein the brake mechanism is connected to the start differential carrier; and a start differential ring gear arranged to mesh with each of the start differential planet gears.

3. The system of claim 2, wherein the first main differential ring gear meshes with a rotor gear of the dynamoelectric device, wherein the second main differential ring gear meshes with the start differential ring gear, the second main differential ring gear configured to mesh with an input gear of the rotationally powered accessory, and wherein the main differential carrier is operatively engaged with the gas turbine engine.

4. The system of claim 1, wherein the rotationally powered accessory is a fixed displacement hydraulic unit engaged with the second main differential ring gear.

5. The system of claim 1 and further comprising:
a variable displacement hydraulic unit engaged with the main differential carrier.

6. The system of claim 1 and further comprising:
an accessory pump engaged with the first main differential ring gear.

7. The system of claim 6, the brake mechanism further comprising:
an actuator for producing a relative axial movement between the first clutch member and the second clutch member.

8. The system of claim 1 and further comprising:
a fluid pump engaged with the main differential.

9. The system of claim 8, wherein the fluid pump comprises a variable displacement hydraulic unit engaged with the main differential carrier.

10. The system of claim 1, wherein the brake mechanism comprises:
a first clutch member fixed to a non-rotating structure; and a second clutch member fixed to the start differential carrier, wherein the clutch is configured to selectively engage the first clutch member and the second clutch member.

11. The system of claim 10, wherein the brake mechanism comprises a mechanical face clutch that engages the first clutch member and the second clutch member through mechanical interference between mating teeth.

12. The system of claim 10, the brake mechanism further comprising:
an actuator for producing a relative axial movement between the first clutch member and the second clutch member.

13. A coupling system comprising:
a dynamoelectric device comprising:
a rotor; and
a stator, wherein the dynamoelectric device is selectively operable as either a generator or an electric motor;

a combustion engine;

a main differential operatively connected between the rotor of the dynamoelectric device and the combustion engine, wherein the main differential is a sunless epicyclic gear assembly comprising:
a plurality of main differential planet gears;
a first main differential ring gear that meshes with a first of the plurality of main differential planet gears; and
a second main differential ring gear that meshes with a second of the plurality of main differential planet gears;

an epicyclic start differential operatively connected to the main differential and the rotor of the dynamoelectric device, wherein the epicyclic start differential comprises:
a start differential sun gear operatively connected to the main differential;
a plurality of start differential planet gears that each mesh with the start differential sun gear;
a start differential carrier connected to each of the start differential planet gears; and
a start differential ring gear arranged to mesh with each of the start differential planet gears;

an accessory device operatively engaged to the main differential; and a brake mechanism connected to the start differential carrier for selectively braking the start differential carrier, wherein the brake mechanism can brake the start differential carrier when the dynamoelectric device is operated as an electric motor to transmit torque from the dynamoelectric device to the combustion engine through the epicyclic start differential and the main differential, with the start differential adjusting torque transmission through the main differential, wherein the start differential is configured to transmit torque between the first main differential ring gear and the second main differential ring gear when the brake mechanism brakes the start differential carrier, and wherein the brake mechanism is configured to be released when the combustion engine transmits torque through the main differential to power the dynamoelectric device as a generator, with the main differential also transmitting torque to power the accessory device.

14. The system of claim 13, wherein the combustion engine comprises a gas turbine engine.

15. The system of claim 13, wherein the start differential ring gear engages the second main differential ring gear, and wherein the start differential sun gear engages the first main differential ring gear.

16. The system of claim 13, wherein the brake mechanism comprises:
- a first clutch member fixed to a non-rotating structure; and
- a second clutch member fixed to the start differential carrier, wherein the clutch is configured to selectively engage the first clutch member and the second clutch member.

17. The system of claim 15, wherein the brake mechanism comprises a mechanical face clutch that engages the first clutch member and the second clutch member through mechanical interference between mating teeth.

18. A method for operating a dynamoelectric device in conjunction with a gas turbine engine, the method comprising:
- depriming the hydraulic unit prior to operating the dynamoelectric device as an electric motor;
- braking a carrier of an epicyclic start differential;
- operating the dynamoelectric device as an electric motor to produce a starter torque output to the gas turbine engine;
- ceasing braking of the carrier of the epicyclic start differential;
- priming the hydraulic unit at or after ceasing braking of the carrier of the epicyclic start differential;
- operating the dynamoelectric device as a generator with an engine torque output from the gas turbine engine; and
- powering an accessory unit with the engine torque output from the gas turbine engine.

19. The method of claim 18, wherein torque is transmitted between the dynamoelectric device and the gas turbine engine via a sunless epicyclic main differential.

* * * * *